UNITED STATES PATENT OFFICE 2,630,446

POLYMERIC SILICATES

William F. Gresham, Wilmington, Del., assignor to E. I. du Pont de Nemours & Company, Wilmington, Del., a corporation of Delaware No Drawing. Application August 4, 1948, Serial No. 42,547

8 Claims. (Cl. 260—448.8)

This invention relates to the preparation of polymeric silicon-containing compounds, and more particularly to the preparation of polymeric compounds for the silicates of mixed monohydric and polyhydric alcohols.

Organo-silicic acid esters and particularly the organo-esters of ortho-silicic acid are well-known. The esters having the general formula $Si(OR)_4$ can be made by reacting silicon tetrachloride with a monohydric alcohol. These esters, however, are not polymeric in nature and have a fixed and invariable composition. In view of the highly desirable properties of the silicates, it would be advantageous to extend their utility to compounds that are of a polymeric nature. Compounds capable of being polymerized can generally be converted to products having a wide range of molecular weights, the extent of which can be controlled by the degree of polymerization. To provide such polymers based on the silicates would markedly advance the art.

An object of the present invention is to provide mixed polymeric organo-silicic acid esters. Another object is to provide polymeric silicic acid esters of a monohydric alcohol and a polyhydric alcohol, and more particularly polymeric silicic acid esters of a monohydric alcohol and a glycol containing at least 4 carbon atoms. A further object is to provide a process for the preparation of silicic acid esters of mixed monohydric and polyhydric alcohols. Yet another object is to provide new compositions of matter, the polymeric silicic acid mixed esters of monohydric and polyhydric alcohols. Other objects and advantages of the invention will hereinafter appear.

Polymerizable organo-silicic acid esters are produced in accord with this invention by ester interchange between an ortho-silicic acid ester of a monohydric aliphatic alcohol and a glycol containing at least 4 carbon atoms in the presence or absence of a monohydric alcohol. The reaction proceeds in accord with this equation:

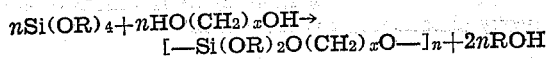

in which $n$ is any integer, $x$ is at least 4, and R is an alkyl group.

More specifically the reaction can be illustrated by the reaction of tetraethyl silicate with hexamethylene glycol which proceeds in accord with this equation:

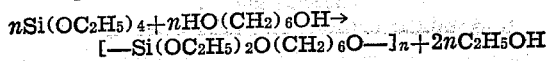

The reaction is preferably conducted under such temperature and pressure conditions that the alcohol displaced from the ortho-silicic acid ester is distilled from the reaction mixture as it is formed, the reaction being conducted at temperatures which range between 50 and 350° C., preferred operations being conducted at temperatures between 100 and 250° C., and under a pressure which may be atmospheric, sub-atmospheric or super-atmospheric. The reaction is conducted for 1 to 48 hours or longer or until no more alcohol is displaced, the shorter period giving more fluid liquids, the longer period more viscous liquids.

The process of the invention includes the preparation of polymeric mixed alcohol esters of ortho-silicic acid and may be carried out in a number of different ways. For example, a lower molecular weight monohydric alcohol ester of ortho-silicic acid may be reacted with any glycol of at least 4 carbon atoms in the presence of a monohydric alcohol having a molecular weight higher than the alcohol from which the ester of the acid is formed. The process may likewise be carried out by reacting a lower molecular weight monohydric alcohol ester of mono-silicic acid with a glycol containing at least four carbon atoms, the reaction being conducted in the presence or absence of a solvent which may be an alcohol that will replace at least one of the alcohol groups of the ester. Another method by which valuable polymeric mixed alcohol esters can be produced includes ester interchange of a low molecular weight monohydric alcohol ester of ortho-silicic acid with a higher monohydric alcohol and thereafter reacting the resulting product with any polyhydric alcohol containing at least 4 carbon atoms.

The reaction may be carried out with or without a catalyst, and if one is used, it may be of an acidic or basic nature. Examples of suitable catalysts include sulfuric acid, lead oxide, the alkali metal or alkaline earth metal alkoxides, zinc oxide, zinc borate and the like.

The proportion of ortho-silicate ester to glycol and monohydric alcohol determines to a large extent the type of product obtained and whether one or more of the alkyl groups of the silicate are replaced. For example, if one mol of a tetraalkyl silicate is reacted with one mol of a glycol containing at least four carbon atoms, two of the alkyl groups of the silicate ester will be replaced by a single glycol group, while if the reaction is conducted between two or more mols of the glycol, all of the ester groups of the silicate will be replaced by two glycol groups. Contrariwise, when the reaction is conducted with equimolar proportions of silicate ester and glycol, whereby two ester groups of the silicate have been replaced by a single glycol group leaving two groups undisplaced by the glycol, one mol of a monohydric alcohol may be present to replace one of the undisplaced alkyl groups of the silicate ester, or two or more mols of the monohydric alcohol may be present and the reaction continued to replace both undisplaced alkyl groups of the silicate ester.

The examples given illustrate preferred embodiments of the invention in which parts are by weight unless otherwise stated:

*Example 1.*—A mixture of 60.107 g. (0.1000 M) purified 3,5,5-trimethylhexyl silicate, $(C_9H_{19}O)_4Si$ (obtained by ester interchange of 3,5,5-trimethylhexanol with tetraethyl silicate at a temperature of 165° C.); 11.812 g. hexamethylene glycol (0.1000 M), and 0.5 g. PbO was heated, on a boiling water bath, at 4 mm. pressure for 2.5 hours. Then 20 g. 3,5,5-trimethylhexyl alcohol was charged as a solvent and heating was continued for 45.7 hours, during which time 44.2 g. nonyl alcohol was distilled out. The residue was a colorless, viscous oil (47.3 g.), with much body. It was insoluble in acetone, and poured slowly even at —40° F. Its viscosity at 100° F. was 53.4 centistokes.

*Example 2.*—A mixture of 0.1033 M hexamethylene glycol, 0.1034 M 3,5,5-trimethylhexyl silicate, 17.0 g. 3,5,5-trimethylhexanol diluent, and 0.4 g. $H_2SO_4$ was heated at 80–95°/1 mm./6 hours, during which time 41.9 g. nonyl alcohol distilled out. The residue was clear, slightly fluid, partly gelatinous material, pale brown in color.

*Example 3.*—A mixture of 0.1000 M ethyl orthosilicate, 0.1000 M hexamethylene glycol, and 0.2000 M 3,5,5-trimethylhexyl alcohol was heated at 205–215° for 46 hours, the pressure being gradually decreased from atmospheric pressure to 2 mm. During this time 3,5,5-trimethylhexanol distilled out. The residue was an almost transparent rubbery gel, which does not melt.

*Example 4.*—A mixture of 0.2009 M ethylene glycol, 0.2039 M ethyl ortho-silicate, and 0.4017 M 3,5,5-trimethylhexanol was heated at 165–300° for eight hours. Then the pressure was decreased and the product was all distilled below 300°/0.5 mm. The last two fractions, 280–300°/0.5 mm., were viscous liquids. They were redistilled, giving 24.5 g. boiling at 214–350°/1 mm. This product, which was soluble in benzene, had a molecular weight of only 659. Thus ethylene glycol, when reacted with the lower monohydric alcohol silicates, leads to a product containing only one or two silicon atoms, rather than a polymer.

Polyhydric alcohols, other than those described in the examples or mixture thereof, (including in said mixtures the glycols of the examples) may be employed for ester interchange with the polyalkyl silicates to give polymeric silicate esters, and as examples of such glycols are included: diethylene glycol, tetramethylene glycol, pentamethylene glycol, octamethylene glycol, triethylene glycol and higher molecular weight glycols. For the preparation of polymeric silicate derivatives, the polyhydric alcohols with the hydroxyl groups on terminal carbon atoms are preferred.

Any suitable solvent may be used in which to conduct the ester interchange reaction, which solvent is inert and does not enter into the reaction. Monohydric aliphatic alcohols may likewise be used as a solvent, but when used they will react if they contain more carbon atoms than the alkyl group present in the ester group of the silicic acid or formed on the acid during the interchange reaction. For example, when monohydric alcohol esters of silicic acid, which ester groups contain less than four carbon atoms, are used polymeric compounds can be produced containing ester groups of higher molecular weight if such alcohols as the straight and branched chain butyl, amyl, nonyl, hexyl, octyl and higher alcohols are employed. Valuable products are also formed from the higher molecular weight alcohols obtained by the carbonylation of olefins as well as the higher alcohols obtained from the catalytic hydrogenation of carbon oxides under elevated temperatures and pressures.

The glycol esters of silicic acid of this invention are especially useful as plasticizers for cellulose organic and inorganic esters and ethers, and for use with synthetic plastics such, for example, as the polymethacrylates, polyvinyl chlorides, polyvinyl acetates, polyvinyl chloroacetates, styrol, glyptals, and the like. The viscous glycol silicate polymers are likewise suitable as synthetic lubricants, as hydraulic fluid adjuvants, and in similar compositions, inasmuch as they have excellent low temperature viscosity characteristics.

The 3,5,5-trimethylhexanol referred to herein may be made by the carbonylation of diisobutylene as disclosed in the copending application of W. F. Gresham et al. S. N. 758,477, now abandoned.

I claim:

1. A polymeric mixed ortho-silicic acid ester of a glycol having the formula:

$$[-Si(OR)_2O(CH_2)_xO-]n$$

in which R is an alkyl group, $x$ is at least 4 and $n$ is an integer greater than 1.

2. A process for producing a mixed polymeric ortho-silicic acid ester of a monohydroxy alkane and an alkylene glycol containing at least four carbon atoms, which comprises ester interchanging, by heating, an ortho-silicic acid mixed ester with at least two dissimilar alkyl groups with an alkylene glycol containing at least four carbon atoms, there being present from 1 to 4 moles of the alkylene glycol per mole of the ortho-silicic acid mixed ester.

3. A process for producing a polymeric mixed ortho-silicic acid ester of a monohydroxy alkane and an alkylene glycol containing at least four carbon atoms, which comprises ester interchanging, by heating, an alkyl ester of ortho-silicic acid, the alkyl groups containing less than four carbon atoms with an alkylene glycol containing at least four carbon atoms, in the presence of a monohydroxy alkane containing at least four carbon atoms, there being present from 1 to 4 moles of the alkylene glycol and at least one mole of the monohydroxy alkane per mole of the ortho-silicic acid ester.

4. A process for producing a polymeric ortho-silicic acid ester of a monohydroxy and a dihydroxy substituted alkane which comprises ester interchanging, by heating, an ortho-silicic acid alkyl ester with a mixture of a monohydroxy and dihydroxy alkanes, there being present at least one mole of the monohydroxy alkane and from 1 to 4 moles of the dihydroxy alkane per mole of the ortho-silicic acid ester.

5. The process of claim 4 conducted at a temperature between 50 and 350° C.

6. A mixed ortho-silicic acid ester of a glycol having the formula $[-Si(OR)_2O(CH_2)_xO-]n$ in which R is an alkyl radical of the group consisting of alkyl groups containing less than four carbon atoms, alkyl groups containing more than four carbon atoms and hydroxy alkyl groups of alkylene glycols containing at least four carbon atoms and in which $n$ is a whole integer and $x$ is at least 4.

7. A mixed polymeric ortho-silicic acid ester of hexamethylene glycol having the formula $$[-Si(OR)_2O(CH_2)_6O-]n$$

in which R is a 3,5,5-trimethylhexyl group and $n$ is greater than 1.

8. A mixed polymeric ortho-silicic acid ester having the formula $[-Si(OR)_2O(CH_2)_6O-]n$ in which R is a radical of the group consisting of ethyl, 3,5,5-trimethylhexyl and hydroxy hexyl radicals and $n$ is greater than 1.

WILLIAM F. GRESHAM.

REFERENCES CITED

The following references are of record in the file of this patent:

UNITED STATES PATENTS

| Number | Name | Date |
|---|---|---|
| 1,178,731 | Knorr | Apr. 11, 1916 |
| 2,027,931 | Ray | Jan. 14, 1936 |
| 2,048,799 | Lawson | July 28, 1936 |
| 2,386,793 | Hanford | Oct. 16, 1945 |
| 2,394,642 | Strain | Feb. 12, 1946 |